United States Patent
De Lima et al.

(10) Patent No.: US 11,807,319 B2
(45) Date of Patent: Nov. 7, 2023

(54) FLEXIBLE SHOE FOR ENDLESS TRACK OF HEAVY MACHINERY AND FLEXIBLE SHOE MANUFACTURING METHOD

(71) Applicant: Vale S.A., Rio de Janeiro (BR)

(72) Inventors: Carlos Adriano De Lima, Canaã Dos Carajas (BR); Bruno Sena E Silva, Canaã Dos Carajas (BR); Cíntia Nunes Braga Regattieri, Canaã Dos Carajas (BR)

(73) Assignee: VALE S.A., Rio de Janeiro (BR)

( * ) Notice: Subject to any disclaimer, the term of this patent is extended or adjusted under 35 U.S.C. 154(b) by 760 days.

(21) Appl. No.: 16/962,199

(22) PCT Filed: Jul. 9, 2019

(86) PCT No.: PCT/BR2019/050259
§ 371 (c)(1),
(2) Date: Jul. 14, 2020

(87) PCT Pub. No.: WO2020/034016
PCT Pub. Date: Feb. 20, 2020

(65) Prior Publication Data
US 2021/0094635 A1    Apr. 1, 2021

(30) Foreign Application Priority Data

Aug. 13, 2018 (BR) .......................... 1020180164767

(51) Int. Cl.
*B62D 55/21* (2006.01)
*B62D 55/20* (2006.01)
(Continued)

(52) U.S. Cl.
CPC ........... *B62D 55/21* (2013.01); *B62D 55/202* (2013.01); *B62D 55/26* (2013.01); *B62D 55/32* (2013.01)

(58) Field of Classification Search
CPC .... B62D 55/202; B62D 55/205; B62D 55/21; B62D 55/26; B62D 55/32
See application file for complete search history.

(56) References Cited

U.S. PATENT DOCUMENTS 3,477,769 A * 11/1969 Thompson ............. B62D 55/26
305/201
4,159,857 A * 7/1979 Purcell ................... B62D 55/28
305/195

(Continued)

FOREIGN PATENT DOCUMENTS

| AU | 2014100032 A4 | 2/2014 |
| CN | 201309515 Y | 9/2009 |

(Continued)

OTHER PUBLICATIONS

International Search Report for PCT/BR/2019/050259 dated Oct. 7, 2019.

*Primary Examiner* — Kip T Kotter
(74) *Attorney, Agent, or Firm* — ArentFox Schiff LLP

(57) ABSTRACT

This invention refers to a flexible shoe for endless tracks of heavy machinery, disclosing a constructive configuration that guarantees greater flexibility and adaptability to the terrain in which the heavy machine circulates and allows that only worn or broken parts of the flexible shoe be replaced. This invention also refers to a flexible shoe manufacturing method, thus disclosing a low-cost simple manufacturing process, making it possible for the flexible shoe to be manufactured only by means of cutting, assembly and steel plate welding processes.

10 Claims, 2 Drawing Sheets

(51) Int. Cl.
*B62D 55/26* (2006.01)
*B62D 55/32* (2006.01)

(56) References Cited

U.S. PATENT DOCUMENTS

| | | | | |
|---|---|---|---|---|
| 4,453,053 | A | * 6/1984 | Yamagata | H01H 9/38 |
| | | | | 218/148 |
| 4,700,992 | A | 10/1987 | Cory | |
| 11,414,143 | B2 * | 8/2022 | Restifo | B62D 55/202 |
| 2014/0346856 | A1 * | 11/2014 | Colwell | B62D 55/12 |
| | | | | 305/185 |
| 2015/0375813 | A1 | 12/2015 | Olsen | |
| 2018/0215427 | A1 * | 8/2018 | Sho | B62D 55/21 |

FOREIGN PATENT DOCUMENTS

| | | | |
|---|---|---|---|
| CN | 102001368 A | | 4/2011 |
| EP | 2088064 A2 | | 8/2014 |
| JP | 2015140157 A | * | 8/2015 |
| KR | 20110026870 A | | 3/2011 |
| WO | 03006305 A | | 1/2003 |
| WO | 2011163504 A | | 12/2011 |

\* cited by examiner

FLEXIBLE SHOE FOR ENDLESS TRACK OF HEAVY MACHINERY AND FLEXIBLE SHOE MANUFACTURING METHOD

CROSS-REFERENCE TO RELATED APPLICATIONS

This application is U.S. National Stage of PCT/BR2019/050259 filed Jul. 9, 2019, which claims priority to Brazilian Application No. BR1020180164767 filed Aug. 13, 2018. The entirety of which is incorporated herewith.

FIELD OF THE INVENTION

This invention refers to a flexible shoe for endless track of heavy machinery, such as tractors and excavators, which move by means of an endless track composed of shoes. This invention also refers to a manufacturing method of such a flexible shoe for heavy machinery.

BACKGROUND OF THE INVENTION

Heavy machinery is applied in various activities such as construction, mining and agriculture, where it is necessary to move large quantities of material or heavy materials, thus requiring high power and capacity equipment to perform these services. Examples of such equipment are tractors and excavators, applied mainly in mining activities.

Due to the size of the equipment and the characteristics of the land where they operate, i.e. uneven lands with various uphills and downhills, as well as possible obstacles in their way, it is necessary that their displacement be carried out by means of endless tracks.

These endless tracks are typically arranged one on each side of the heavy machine or in double sets, according to the characteristics of each piece of equipment, making it possible to sustain and move it along uneven terrain with difficult access and movement.

The endless track is composed of several shoes, which are associated with each other, forming an elliptical-shaped endless track when stretched, that is, the shoes are all joined together and do not have an initial and terminal end, therefore the nomenclature "endless track".

In order for such a heavy machine to move by means of the track, it is necessary to rotate the endless track so that it propels the equipment forward when it is rotated clockwise and backwards when rotated counterclockwise.

This movement of the endless track and, consequently, of the machine on which it is installed, is carried out by means of a drive wheel, which is arranged in contact with the inner face of the endless track so that, when the drive wheel rotates, it contacts the inner side of the endless track and its external side contacts the ground to perform the movement.

To avoid a misalignment of the endless track regarding the drive wheel or the desirable path of the heavy machine, as well as to maintain the stretching of the track, guide rollers are arranged in contact with the inner face of the endless track along the path that it travels, preventing it from dissociating from the machine, in addition to maintaining a precise path.

Due to the use of the heavy machinery during the activities in which it is needed, the shoes arranged on its endless track are subjected to excessive wear due to constant friction with the drive wheels, guide wheels and also with the ground, thus requiring the periodic replacement of these elements.

In the state of the art, the shoes are made of cast iron and they are cast in an integral and solid way. Due to the manufacturing material of the shoes, they have a low tensile/bending resistance, causing them to suffer frequent breaks and so they must be changed, resulting in losses due to the need to keep the machine out of operation during the replacement.

Furthermore, due to the fact that these prior-art shoes are manufactured in an integral manner, it is not possible to change only the broken or worn out part of this element, there is a need to change the shoe completely, i.e. remove the broken or worn out shoe and put a new one in its place, which generates significant costs in acquiring or manufacturing this new shoe.

Therefore, due to the high stiffness and low tensile/bending resistance of the prior-art shoes, as well as to the impossibility of changing only its worn out or broken part, the total cost of the maintenance process of the heavy machinery is extremely high, since the machines have to be out of operation during the entire shoe replacement process, in addition to the costs of buying new shoes.

There are, still in the state of the art, some patent documents that disclose shoes for endless tracks of heavy machines, one of them being the document AU2014100032, which discloses a shoe applied to heavy equipment moved by means of endless tracks which has an assembly to help reduce the wear of this element and make it possible to replace only the worn-out part of the shoe.

The shoe disclosed in AU2014100032 comprises a body, a friction surface, bushings and ears. The body of the shoe has a rectangular shape with a hollow interior to reduce its weight and it is made of high hardness metal to resist wear due to the locomotion of the equipment by means of the endless track in which the shoe is installed.

Ears are placed on the side faces of the shoe's body, these ears being interspaced to allow the association of one shoe with the other through the insertion of pins passing through these ears.

To ensure the best attachment of these coupling pins between the shoes, bushings are inserted into the holes of the ears, also allowing the bushings to be worn due to friction with the pin, replacing only the bushings and not the ears when they are worn out.

The friction surface consists of the part of the shoe that is arranged in direct contact with the equipment's drive wheel during its movement and consequently, it is the part of the shoe that wears down the most. This friction surface is fixed to the body of the shoe by means of welding, allowing this weld to be broken when worn, and the friction surface replaced by a new one, without the need to replace the entire shoe.

However, one disadvantage of the shoe disclosed in document AU2014100032 is that its only dismountable or replaceable parts consist of the bushings and of the friction surface, not allowing the replacement of all its parts in case of breakage or wear of a part different from those (bushings and friction surface).

Furthermore, in document AU2014100032, only the friction surface is welded to the shoe, and its entire structure is formed by means of casting processes, which does not guarantee flexibility when using this element on the endless track and, consequently, when moving the machine to which it is applied.

Another prior-art patent document is CN102001368A, which discloses a shoe applied on endless tracks for the handling of heavy equipment such as cranes and excavators, the shoe being used to increase contact and engagement between the endless track drive wheel and the shoes that make up the track.

The shoe of CN102001368A comprises a body, ears and an engaging element. The body of the shoe is, in its preferred embodiment, manufactured through the casting process, forming a single piece. This body has a rectangular shape, with the ears on its sides interspersed and spaced so as to allow the association between a shoe and another by inserting pins through these ears.

The engaging element is arranged in the center of the shoe's body, on the contact face with the endless track drive wheel. This element has a cylindrical shape to enlarge and facilitate the contact of the drive wheel with the shoe and thus increase the control and handling force of the equipment.

Although the document CN102001368A discloses a constructive arrangement for endless track shoes applied on heavy machinery, such a constructive arrangement has the same shortcomings as the state-of-the-art common shoe, not allowing the replacement of only the worn or broken parts of the shoe.

In addition, the shoe of CN102001368A is also a solid, one-piece shoe, thus not disclosing flexibility and reliability for the heavy machine in which it is installed.

Another state-of-the-art patent document is CN201309515Y which discloses a shoe for heavy equipment that uses endless tracks for displacement, being that the structure of this shoe is made of welded steel plates.

The CN201309515Y shoe comprises a base plate, an engaging element, side plates, ears and reinforcement. The body of the shoe is composed of a base plate and side plates welded perpendicularly on both sides of the base plate, forming a rectangular structure.

The ears are also attached to the side plates, which are positioned in series and in an interspersed way to allow the association of one shoe with another by means of pins passing through these ears.

The engaging element is welded to the center of the side plate, responsible for the contact of the shoe with the drive wheel for the movement of the endless track and, consequently, of the vehicle.

Reinforcements are also fixed close to the engaging element and between the side plates, thus preventing the shoe structure from being deformed according to its use.

However, although the shoe in document CN201309515Y is made from welded steel plates, it does not have any other means of fixing the plates, not providing sufficient reliability when applied on heavy machinery.

Such lack of reliability stems from the fact that, since the plates are fixed only by welding to form the shoe, a break in this weld would generate an accident and consequent downtime of the machine, thus producing a great loss.

Thus, there is no state-of-the-art flexible shoe for heavy machinery that discloses a constructive configuration that guarantees flexibility and adaptability to the terrain in which the machine moves.

There is also not, in the state of the art, a flexible shoe that can be reused, allowing the replacement of only its worn out or broken part, which would avoid the cost of fully replacing this element.

In addition, there is no state-of-the-art flexible shoe for heavy machines with a secure construction configuration, disclosing a secure fixation between the parts that compose the flexible shoe.

However, there is no state-of-the-art method of manufacturing and assembling a flexible shoe with simplicity of manufacturing, low cost and no need for casting.

OBJECTS OF THE INVENTION

This invention aims to provide a flexible shoe for heavy machinery with a construction configuration that provides flexibility and adaptability to the terrain in which the machine moves.

This invention also aims to provide a flexible shoe for heavy machinery with a secure construction configuration that allows the replacement of only the worn-out or broken parts of the shoe.

Finally, this invention also aims to provide a flexible shoe manufacturing method with manufacturing simplicity, low cost and without the need for casting.

SUMMARY OF THE INVENTION

In its preferred embodiment, the present invention discloses a flexible shoe for the endless track of heavy machinery that comprises: a base plate; an engaging element; a plurality of ears; a key plate; and two locking plates.

The base plate has an upper side and a lower side. The engaging element comprises a rectangular shaped lower portion and a hexagonal shaped upper portion, the base of its lower portion being fixed in the center of the upper face of the base plate and provided with a transversal hole in the center of the lower portion.

The ears are arranged in series, perpendicular to the upper face of the base plate, and linearly arranged on both sides of the engaging element, comprising a central portion of rectangular shape with a transversal hole arranged in its center and a lateral portion of convex curved shape with a hole arranged near its lateral end.

The key plate comprises an elongated rectangular structure with two transverse holes close to its distal ends, configured to be arranged in a passageway through the transverse holes arranged in the lower portion of the engaging element and in the central portion of the ears.

The two locking plates are configured to be inserted one in each of the transversal holes of the key plate in a through manner and fixed to the upper face of the base plate.

The flexible shoe comprises eight ears, four ears being arranged on one side of the engaging element and four ears on the other side of the engaging element. These ears are arranged in series in an interspersed manner, the side portions of four ears being arranged on the right side of the central portion and the side portions of the other four ears being arranged on the left side of the central portion, being fixed one ear to the right next to one ear to the left and so on.

This interspacing of the ears allows the association of a flexible shoe with another flexible shoe by the insertion of pins passing through both ears of these flexible shoes simultaneously.

The ears are classified and distributed as follows: two central ears arranged on both sides of the engaging element; four intermediate ears arranged next to both central ears, side opposite the engaging element; and two external ears arranged next to both intermediate ears further away from the engaging element.

The central ears, arranged on both sides of the engaging element, are composed of three ears attached in parallel and welded together. The intermediate ears and the external ears, arranged at least one ear away from the engaging element, are composed of two ear plates attached in parallel to each other.

The engaging element consists of three toothed plates fixed in parallel and welded together.

The flexible shoe also comprises four reinforcements arranged on the outermost ears on both sides of the flexible shoe, fixing it to the base plate by welding the reinforcements with the base plate and with the outermost ears simultaneously.

This invention also discloses a method of manufacturing a flexible shoe, as defined above, comprising the following steps: (i) cutting the plates that make up the flexible shoe, these being: base plate; key plate; ear plates; toothed plates; reinforcements; and locking plate; (ii) drilling the plates that require drilling, these being: the ear plates; toothed plates; and the key plate; (iii) welding the toothed plates to form the engaging element; (iv) fixing the engaging element to the center of the upper face of the base plate and positioning the key plate for passing through the hole of the engaging element; (v) mounting the center ears on both sides of the engaging element, inserting three ear plates and fixing them by means of the key plate through the holes of the ear plates and by means of welding between the ear plates; (vi) mounting the intermediate ears and the external ears placed next to both central ears mounted in the previous step, inserting two ear plates for each ear and fixing them by means of the key plate passing through the transverse holes of the ear plates; (vii) fixing the reinforcements in both external ears, fixing them to the base plate by welding the reinforcements with the external ears to the base plate simultaneously, and fixing the locking plates by passing through the holes in the key plate and welded to the base plate.

BRIEF DESCRIPTION OF THE DRAWINGS

The present invention is described in detail based on the respective figures.

DETAILED DESCRIPTION OF THE INVENTION

This invention proposes a flexible shoe 1 for use on endless tracks 2 of heavy machinery such as tractors and excavators applied in mining activities.

This flexible shoe 1 has a constructive configuration that guarantees greater flexibility and adaptability to the terrain in which the heavy machine circulates, increasing reliability and resistance to breakage and early wear of the flexible shoe 1.

In addition, the constructive configuration of flexible shoe 1 also allows only the worn parts of the shoe to be replaced, thus avoiding the integral replacement of this element and generating great cost savings.

Figure 1:
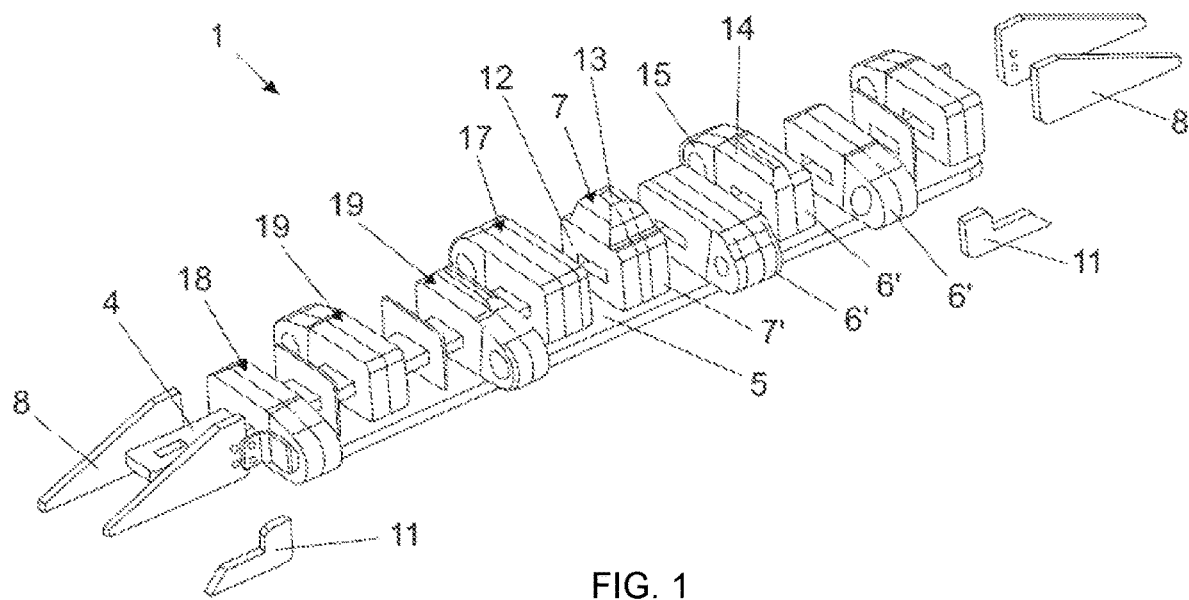
FIG. 1—discloses an exploded perspective view of the flexible shoe.

The flexible shoe 1 comprises a key plate 4, a base plate 5, a plurality of ears, an engaging element 7, and four reinforcements 8, as shown in FIG. 1.

The function of the key plate 4 is to secure the parts that make up the flexible shoe 1, more specifically to secure the engaging element 7 and the ears. This key plate 4, in its preferred embodiment, has an elongated rectangular shape with rounded corners, thus allowing the insertion of transversal holes arranged in the ears and in the engaging element 7.

This fixation is achieved by inserting key plate 4 into the inside of transversal holes drilled in the ears and the engaging element 7, being provided with a sufficient length to be passed through both elements (ears and engaging element 7), preventing them from dissociating from the key plate 4.

In addition, key plate 4 allows the fixation of some ears without having to be welded to the base plate 5 or key plate 4, ensuring greater flexibility to the flexible shoe 1 and thus avoiding early breakage of the flexible shoe 1, which provides greater adaptability to the terrain on which the heavy machine circulates.

The base plate 5, as its name already infers, is used as the base for the flexible shoe 1. This base plate 5 preferably has a rectangular shape with rounded corners, having an upper face 5' and a lower face 5".

This base plate 5 necessarily has a longer length than key plate 4, allowing the end of key plate 4 to be attached to the base plate 5 and avoid their movement and consequently avoiding the dissociation of the elements fixed to the key plate 4.

The lower face 5" of the base plate is configured to be in contact with the ground when installed on the endless track 2 of the heavy machine, thus ensuring the necessary traction with the ground to enable the movement of the equipment.

The upper face 5' of the base plate 5 is configured to secure and support the other parts of flexible shoe 1, each of these parts and the means of securing them are described below.

The engaging element 7 is configured to be arranged in contact and, as its name implies, to engage the flexible shoe 1 with the endless track 2, making it possible to move the flexible shoe 1 and consequently the endless track 2 through this engagement.

The engaging element 7 is preferably composed of a lower portion 12 of rectangular shape and a higher portion 13 of hexagonal shape, analogous to a straight gear tooth, as shown in FIG. 1.

The base of the lower portion 12 of the engaging element 7 is fixed perpendicular to the center of the upper face 5' of base plate 5 by means of a welding process, while the upper portion 13 of the engaging element 7 is kept free and responsible for engaging flexible shoe 1 with the drive wheel.

Thus, the attachment of the engaging element 7 with base plate 5 allows the upper portion 13 of this element to be the farthest portion from base plate 5, making this upper portion 13 to have contact with the drive wheel without any other part of the flexible shoe 1 also having contact.

The lower portion 12 of the engaging element 7 also comprises a transverse hole through its center, allowing the key plate 4 to pass through this hole to ensure the fixation of this element to the base plate 5.

That is, key plate 4 is passed through the transverse hole in the engaging element 7 parallel to the base plate 5, which prevents the engaging element 7 from dissociating from them due to the fixation of key plate 4 and to the welding with the base plate 5, increasing the reliability of the flexible shoe 1.

This engaging element 7, in its preferred embodiment, is composed of three toothed plates 7', which are fixed parallel to each other by welding to form the engaging element 7.

In this way it is possible to break the weld between the toothed plates 7' to replace only the one that is damaged, it is not necessary to replace the entire engaging element 7'.

The ears are configured to allow association between the flexible shoes 1 that make up the endless track 2 of the heavy machine in which they are installed. The number of ears varies according to the size of the flexible shoe 1, the quantity of ears in the preferred configuration of flexible shoe 1 is described below, however, without being limited to this specific quantity.

The ears are composed of two portions, these being a central portion 14 with a rectangular shape and a lateral portion 15 with a rounded shape in a convex way, as shown in FIG. 1.

The central portion 14 of the ear is also provided with a transversal passing hole in its center, allowing the passage of key plate 4 through this hole to ensure its fixation.

Figure 3:
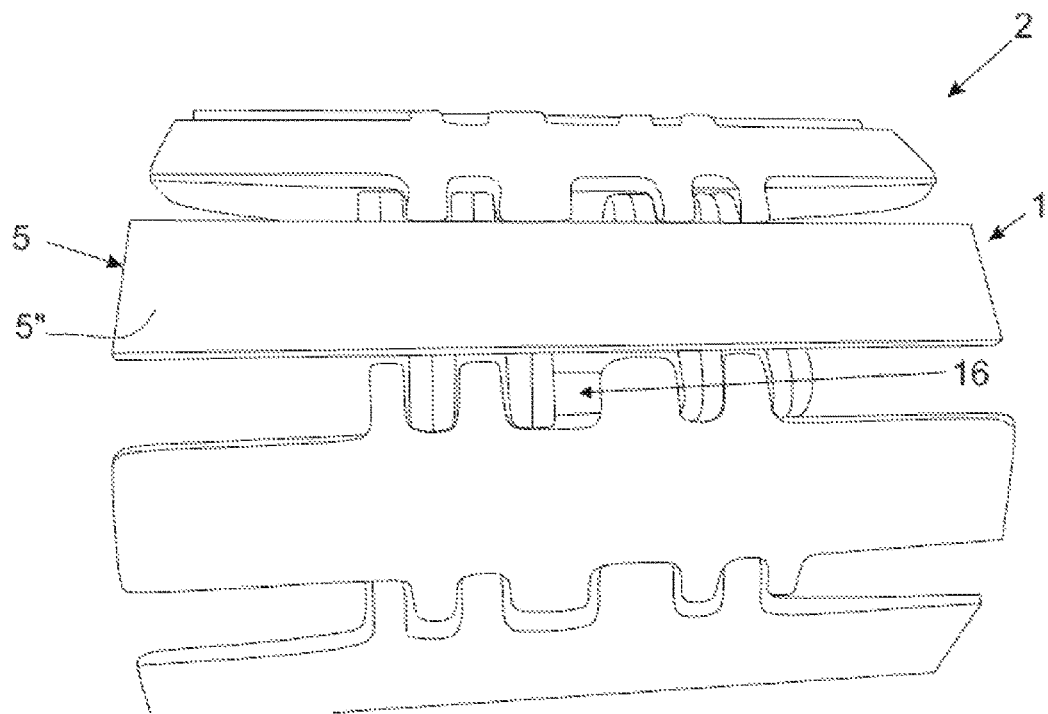
FIG. 3—discloses a front view of the flexible shoe installed on the endless track of a heavy machine.

The lateral portion 15 of the ear has a round hole near its lateral end opposite to the central portion 14, this hole being used for the insertion of a pin 16, to ensure the association of flexible shoe 1 with another flexible shoe by inserting pins 16 into the ears of two flexible shoes 1 simultaneously, as shown in FIG. 3.

These ears are fixed in series in an interspersed way, that is, some have their lateral portion 15 arranged to the right and others have their lateral portion 15 arranged to the left, thus allowing flexible shoe 1 to be associated with two different flexible shoes 1. That is, it allows flexible shoe 1 to have ears on the left side as well as on the right side.

Figure 2:
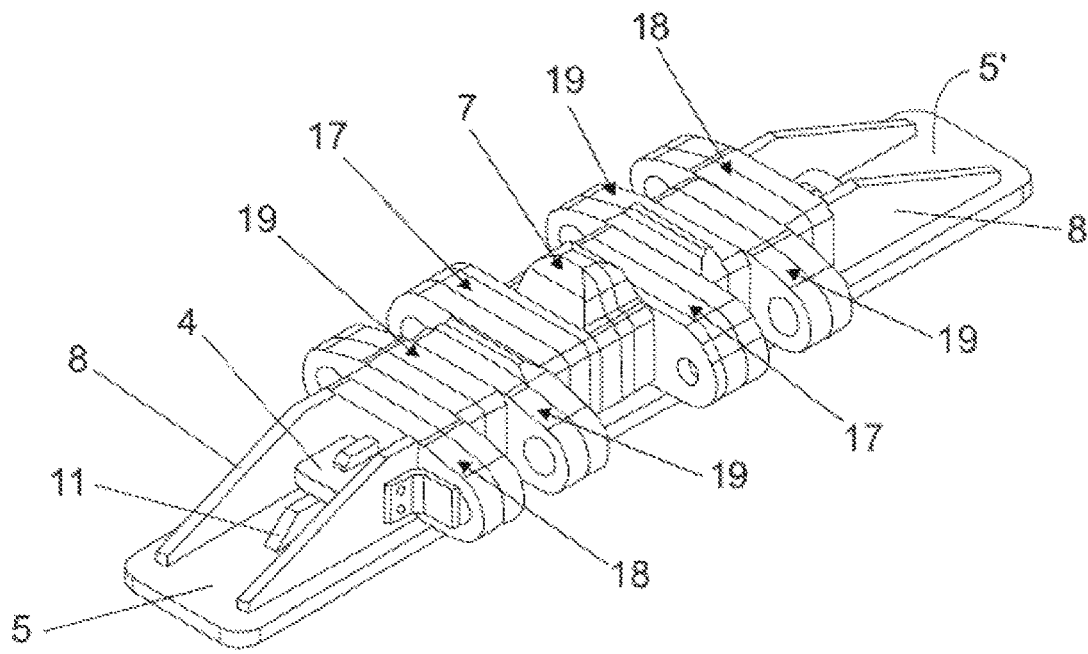
FIG. 2—discloses a perspective view of the flexible shoe.

Thus, in its preferred embodiment, four ears are arranged on the left side of flexible shoe 1 and four ears on the right side of flexible shoe 1, as shown in FIG. 2.

These ears are fixed in series, perpendicularly arranged to the upper face 5' of the base plate 5 and linearly arranged to the engaging element 7, being arranged side by side. Thus, as the engaging element 7 is fixed to the center of the base plate 5, the flexible shoe 1 has a symmetry from this element, four ears being placed on each side of the engaging element 7.

These ears have their sides interspersed, so that if the ear closest to the engaging element 7 has its lateral portion 15 to the right, the next ear, i.e., the one placed next to it, will necessarily have its lateral portion 15 to the left, and so on.

This intercalation between the sides of the ears is necessary to allow a spacing between them for the insertion of the ear of another flexible shoe 1 into this space and thus, insert a pin 16 in these ears simultaneously, ensuring the association between the flexible shoes 1.

The ears are classified and differentiated according to their position in relation to the engaging element 7, the ears being arranged next to the engaging element called central ears 17, the ears which move further away from the engaging element 7 called external ears 18 and the ears arranged between the central ears 17 and the external ears 18 called intermediate ears 19, as shown in FIG. 2.

The central ears 17, i.e. those arranged on both sides of the engaging element 7, have a double fixation to increase their strength and avoid breakage, being welded to the base plate 5 and also fixed by means of the key plate 4 through its transversal hole.

This double fixation is necessary for the central ears 17, i.e. close to the engaging element 7, because this central area suffers an excessive effort due to the engagement with the drive wheel, therefore requiring a secure fixation to prevent breakage or failure of flexible shoe 1 in order to prevent accidents and machine downtime for maintenance.

In the preferred embodiment of the central ears 17, these are composed of three ear plates 6' welded parallel to each other to form the central ear 17, facilitating the manufacture of this element and allowing the replacement of only the worn ear plates 6', not requiring the replacement of the entire ear.

With respect to the external ears 18 and the intermediate ears 19, these being the ears that are not arranged on the sides of the engaging element 7, these do not have a double fixation, they are only fixed by means of the key plate 4 through its transversal holes.

These intermediate 19 and external 18 ears do not have a double fixation because they are arranged in an area of lower demand of the flexible shoe 1, this unique fixation does not create a lack of safety or risk of breaking the flexible shoe 1.

In addition, the fixation only by means of key plate 4 provides greater flexibility to the flexible shoe 1, allowing it to better adapt to the terrain in which the heavy machinery circulates.

Reinforcements 8 consist of ribs configured to avoid the longitudinal movement of the external ears 18 and the engaging element 7, preventing them from dissociating from the key plate 4 inserted inside their transversal holes.

These reinforcements 8 are fixed on both external ears 18, that is, on the two ears furthest from the engaging element 7, being welded, in their preferred embodiment, two reinforcements 8 on each external ear 18.

These reinforcements have, preferably, a triangular shape, with one of its cathetus welded to the base plate 5 and the other cathetus fixed to the external ear 18, securing the external ears 18 and preventing the other ears from moving and thus dissociating themselves from the key plate 4.

In addition to reinforcements 8, key plate 4 also comprises a passage hole near each distal end of the key plate, allowing the insertion and welding of a locking plate 11. This locking plate 11, in its preferred embodiment, has an "L" shape, with the smaller side passing through the hole of the key plate 4 and the larger side welded to the base plate 5, which prevents any movement of the key plate 4.

Thus, both the locking plate 11 and the reinforcements 8 ensure that the key plate 4, which is responsible for fixing the ears and the engaging element 7, perform any kind of movement, providing a flexible and safe constructive configuration for the flexible shoe 1.

All the elements that make up the flexible shoe 1, i.e. the key plate 4, the base plate 5, the engaging element 7, the ears and the reinforcements 8, in their preferred configurations, are manufactured in rolled steel, decreasing the manufacturing cost and simplifying its manufacturing ne when compared to the manufacturing by casting.

With the description of flexible shoe 1, as well as all its composing elements, the manufacturing method for said flexible shoe 1 is described below, composed of seven steps.

The first step consists of cutting the plates that form the flexible shoe 1, these being the key plate 4, the base plate 5, the toothed plates 7', the ear plate 6', reinforcements 8 and the locking plate 11.

This cutting step is performed preferably by means of oxyfuel cutting processes, thus reducing the cost of this step and also simplifying its manufacture. In alternative embodiments, the cutting of the pieces can be performed by laser cutting processes, waterjet cutting or other processes that allow cutting the rolled steel plate used for the manufacture of the flexible shoe.

The second stage consists of drilling the sheets already cut, with each piece that makes up the flexible shoe and requires drilling. Drilling of key plate 4 is performed near its distal ends, this being a rectangular hole for association with locking plate 11.

The toothed plate 7' is drilled in the center of its lower portion 12, this being a rectangular hole for passing and fixation of the same by means of key plate 4. The ear plate 6' has two holes, one of which is similar to the toothed plate 7' hole, i.e. a transversal hole in its central portion 14 to pass the key plate 4, and a round hole near the lateral end of its lateral portion 15, configured for passage of pin 16 for the association of flexible shoe 1 with other shoes.

Regarding the other plates that make up the flexible shoe 1, i.e., the base plate 5, the locking plate 11 and the reinforcements 8, these do not have holes and therefore, they are not submitted to the second step of the manufacturing method.

This drilling can be performed by the same process as the first step of the method, or another step capable of performing the drilling, e.g. oxyfuel cutting, laser cutting, waterjet cutting, milling and others.

The third stage consists of assembling the engaging element 7, which is composed of three toothed plates 7' welded together to form the engaging element 7.

This assembly is important because the engaging element 7 is submitted to great effort, being disposed in direct contact with the drive wheel to realize the movement of the endless track 2 and, consequently, of the heavy machine.

With the engaging element 7 assembled, the fourth step of the method is started, which is the attachment of the engaging element 7 to the base plate 5. This attachment is preferably made by welding the base of the lower portion 12 of the engaging element 7 to the center of the base plate 5.

Still in the fourth step, key plate 4 is also fastened to the engaging element 7, being arranged through the hole in the lower portion of the engaging element 7 and in parallel with the base plate 5 on which it is fixed.

Thus, the engaging element 7 is arranged in the center of both the base plate 5 and the key plate 4, allowing further assembly on both sides of this element.

Figure 4:
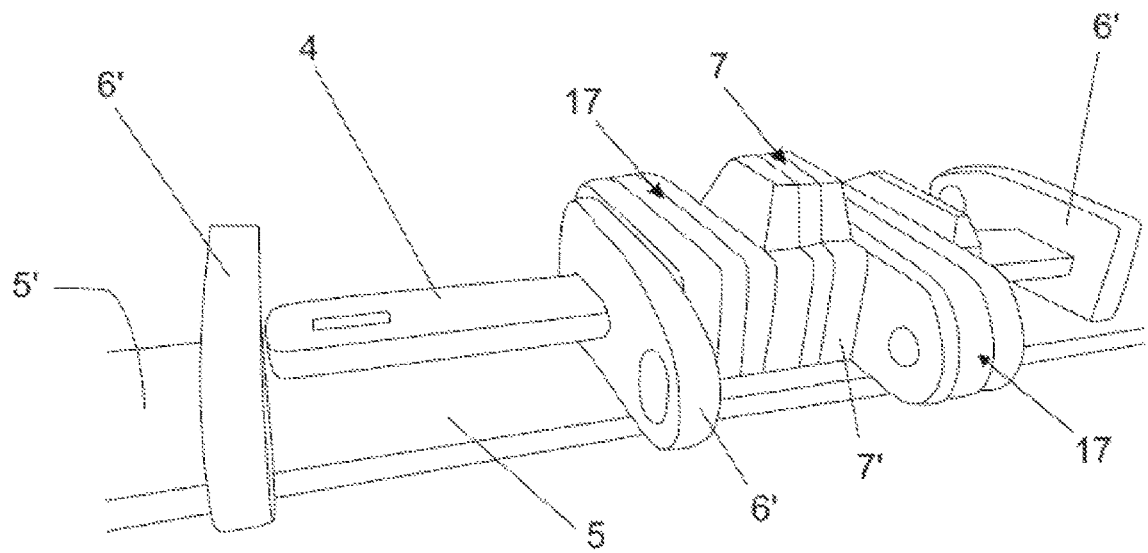
FIG. 4—discloses a perspective view of the flexible shoe assembly.

The fifth stage consists of assembling the ears, which are assembled with the help of base plate 5 and key plate 4. In this step, the ear plates 6' are fitted to key plate 4 and, consequently, they are supported on the base plate 5, which is mounted in such a way that the key plate 4 is passed through its central hole, as shown in FIG. 4.

The central ears 17, arranged next to the engaging element 7, in their preferred configuration, are composed of three ear plates 6' fixed side by side.

Furthermore, it is important to remember that the ears of the flexible shoe have their sides interspersed, so if on one side of the engaging element 7 an ear is placed on the right side, on the other side of the engaging element 7, an ear will necessarily be placed on the left side, i.e. the opposite side.

Thus, in the fifth step three ear plates 6' are attached to the right side of one side of the engaging element 7, and three ear plates 6' are attached to the left side of the other side of the engaging element 7, forming both central ears 17 of flexible shoe 1.

These ear plates 6' which form the central ears 17 are welded together to ensure greater reliability in this central part of flexible shoe 1, the part which is most subject to stress because it is arranged in contact with the drive wheel.

Then, with the two central ears 17 fixed and welded next to the engaging element 7, the sixth stage is initiated, in which three more ears are fixed linearly arranged with the central ears 17, these two being intermediate ears 19 and an external ear 18 on each side.

The ears are composed of only two ear plates 6', which are fixed by means of the key plate 4 which is passed through its transversal holes, also remaining supported on the base plate 5. In this way, the ear plates 6' that make up the intermediate ears 19 and the external ears 18 are not welded and are fixed only by means of key plate 4 and base plate 5, which guarantees flexibility to the flexible shoe 1.

All eight ears mounted on flexible shoe 1 are interspersed, i.e. one ear is placed on the right side followed by one ear on the left side and so on, not having two consecutive ears on the same side.

After mounting and fixing the four intermediate ears 19 and the two external ears 18, symmetrically distributed on both sides of flexible shoe 1, the seventh and last step starts, which consists in securing the reinforcements 8 to ensure the fixation of the intermediate 19 and external 18 ears that are not welded to the base plate 5.

Reinforcements 8 are fixed to the two external ears 18, i.e. the two ears furthest from the engaging element 7. These reinforcements 8 are then welded to the external ears 18 and to the base plate 5, preventing the ears from moving and therefore dissociating from the key plate 4.

Still in the seventh stage, the locking plates 11 are also fixed, and a locking plate 11 is placed at each end of the key plate 4, thus allowing this element to be fixed and avoid its movement.

To fasten the locking plate 11, it has one side passing through the hole arranged in the key plate 4 made in the second step, and the other side welded to the base plate 5, thus ensuring the fixation of key plate 4 with the base plate 5.

Thus, with all elements fixed by means of key plate 4, base plate 5, reinforcements 8 and locking plates 11 as described in detail above, the manufacturing method for the flexible shoe 1 is then completed.

Having described Flexible shoe 1 for endless tracks 2 of heavy machines, as well as the method of manufacture of said flexible shoe 1, it is concluded that the present invention achieves its objectives, disclosing a flexible shoe 1 for heavy machinery with a constructive configuration that provides flexibility and adaptability to the terrain in which the machine moves.

Furthermore, the flexible shoe 1 of this invention, due to its cast-free assembly, discloses a secure construction and allows replacement of only the worn parts of the shoe, generating a significant economy by not replacing the entire shoe 1.

Nevertheless, the flexible shoe 1 manufacturing method, due to the fact that it is carried out by means of cutting, assembly and welding of plates, presents great simplicity in relation to casting processes, in addition to disclosing a low cost for its manufacture.

Therefore, it should be understood that flexible shoe 1 for the endless track 2 of heavy machinery, as well as the flexible shoe 1 manufacturing method described here are only some of the modalities and examples of situations that could occur; the real scope of protection of the object of the present invention is defined in the claims.

The invention claimed is:

1. A flexible shoe for endless track of heavy machinery, comprising:
   a base plate with an upper face and a lower face;
   an engaging element comprising a lower portion of rectangular shape and a higher portion of hexagonal shape, a base of the lower portion being fixed in a center of the upper face of the base plate and provided with a transverse hole in a center of the lower portion;

a first plurality of ears arranged in series, perpendicular to the upper face of the base plate and linearly arranged on a first side of the engaging element, and a second plurality of ears arranged in series, perpendicular to the upper face of the base plate and linearly arranged on a second side of the engaging element, each ear of the first plurality of ears and the second plurality of ears comprising a central portion of rectangular shape with a transverse hole arranged in its center and a lateral portion of convex curved shape with a hole arranged near a lateral end of its lateral portion;

a key plate comprising an elongated rectangular structure with two transverse holes close to its distal ends, configured to be arranged in a passageway through the transverse hole arranged in the lower portion of the engaging element and the transverse hole in the central portion of each ear; and two locking plates each configured to be inserted into one of each transverse hole of the key plate and fixed to the upper face of the base plate.

2. The flexible shoe according to claim 1, wherein the first plurality of ears comprises four ears arranged on the first side of the engaging element and the second plurality of ears comprises four ears arranged on the second side of the engaging element.

3. The flexible shoe according to claim 2, wherein lateral portions of ears of the first plurality of ears and the second plurality are arranged to extend to different sides of the flexible shoe in an alternating manner, wherein each of the ears is next to at least one other ear.

4. The flexible shoe according to claim 3, wherein the flexible shoe is associated with a second flexible shoe by inserting pins through ears of both flexible shoes simultaneously.

5. The flexible shoe according to claim 1, wherein the first plurality of ears and the second plurality of ears comprise, in combination: two central ears including one respective central ear arranged on each side of the engaging element; four intermediate ears including two respective intermediate ears arranged next to each of the one respective central ear opposite to the engaging element; and two external ears including one respective external ear arranged next to each of the two respective intermediate ears further away from the engaging element.

6. The flexible shoe according to claim 5, wherein each of the two central ears comprise three ear plates fixed in parallel and welded together.

7. The flexible shoe according to claim 5, wherein each of the four intermediate ears and each of the two external ears comprise two ear plates fixed parallel to each other by the key plate.

8. The flexible shoe according to claim 1, wherein the engaging element comprises three toothed plates attached in parallel and welded together.

9. The flexible shoe according to claim 1, wherein the first plurality of ears and the second plurality of ears each comprise an outermost ear, and wherein the flexible shoe comprises two reinforcements fixedly arranged on each outermost ear and the base plate.

10. A method of manufacturing the flexible shoe according to claim 1, comprising:
   i. forming each of the base plate; the key plate; ear plates; toothed plates; reinforcements; and the two locking plates via cutting;
   ii. drilling holes into each of the ear plates; the toothed plates; and the key plate;
   iii. welding the toothed plates to form the engaging element;
   iv. attaching the engaging element to the center of the upper face of the base plate and positioning the key plate through the hole in the engaging element;
   v. assembling a central ear of each of the first plurality of ears and the second plurality of ears by providing three ear plates and securing them by the key plate through holes in the three ear plates and welding between the three ear plates;
   vi. assembling intermediate ears and an external ear next to each central ear by providing two ear plates for each of the intermediate ears and each external ear and securing the two ear plates via the key plate through the holes in the two ear plates; and
   vii. fixing respective ones of the reinforcements to each external ear by welding the respective ones of the reinforcements them to each external ear and the base plate, and fastening the two locking plates by passing a respective locking plate through a respective one of the two transverse holes in the key plate and welding each of the two locking plates to the base plate.

* * * * *